(12) United States Patent
Wang et al.

(10) Patent No.: US 12,007,164 B2
(45) Date of Patent: Jun. 11, 2024

(54) REFRIGERATING AND FREEZING DEVICE

(71) Applicants: QINGDAO HAIER REFRIGERATOR CO., LTD., Shandong (CN); HAIER SMART HOME CO., LTD., Shandong (CN)

(72) Inventors: Haijuan Wang, Qingdao (CN); Peng Li, Qingdao (CN); Dongqiang Cao, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 388 days.

(21) Appl. No.: 17/431,269

(22) PCT Filed: Feb. 12, 2020

(86) PCT No.: PCT/CN2020/074886
§ 371 (c)(1),
(2) Date: Aug. 16, 2021

(87) PCT Pub. No.: WO2020/168959
PCT Pub. Date: Aug. 27, 2020

(65) Prior Publication Data
US 2022/0128297 A1    Apr. 28, 2022

(30) Foreign Application Priority Data
Feb. 19, 2019   (CN) .......................... 201920210465.8

(51) Int. Cl.
*F25D 31/00*    (2006.01)
*F25D 11/02*    (2006.01)
*F25D 23/12*    (2006.01)

(52) U.S. Cl.
CPC ............ *F25D 31/005* (2013.01); *F25D 11/02* (2013.01); *F25D 23/12* (2013.01); *F25D 2400/02* (2013.01)

(58) Field of Classification Search
CPC .... F25D 31/005; F25D 2400/02; F25D 11/02; A23L 3/365
See application file for complete search history.

(56) References Cited

U.S. PATENT DOCUMENTS 7,179,990 B2 *  2/2007  Kanazawa ............. H02G 3/088
                                                    174/59
7,667,992 B2 *  2/2010  Wong .................. H02M 1/4225
                                                    363/41

(Continued)

FOREIGN PATENT DOCUMENTS

CN          2193519 Y       3/1995
CN        101043806 A       9/2007

(Continued)

OTHER PUBLICATIONS

International Search Report for PCT/CN2020/074886 (ISA/CN) dated Apr. 22, 2020 (5 pages).

(Continued)

*Primary Examiner* — Lionel Nouketcha
(74) *Attorney, Agent, or Firm* — Alston & Bird LLP

(57) ABSTRACT

A refrigerating and freezing device (1) includes a cabinet, wherein at least one storage compartment (11) is defined therein, and a heating cavity is defined in one of the storage compartments (11); and an electromagnetic heating device, configured to supply electromagnetic waves into the heating cavity so as to heat a to-be-processed object, wherein the electromagnetic heating device is provided with an electromagnetic generation module (21) configured to produce an electromagnetic wave signal and a power supply module (24) configured to supply a power source to the electromag- (Continued)

netic generation module (21). A power supply box (40) is provided above a top of the cabinet (10), and heat dissipation holes configured to achieve communication between the interior of the power supply box (40) and an external environment where the power supply box (40) is located are provided in a box body of the power supply box (40). The power supply module (24) is disposed in the power supply box (40), a heat dissipation fan (31) is further provided in the power supply box (40) and is configured to drive airflow to flow between the interior of the power supply box (40) and the external environment where the power supply box (40) is located through the heat dissipation holes, so as to dissipate heat from the power supply module (24). The decrease of service life and efficiency caused by temperature rise during continuous working of the power supply module (24) and burn hazards caused by unintentional touch by users are completely eradicated, and meanwhile space is saved.

9 Claims, 4 Drawing Sheets

(56) References Cited

U.S. PATENT DOCUMENTS

| | | | |
|---|---|---|---|
| 2007/0236880 A1* | 10/2007 | Noisternig | G11B 33/10 |
| 2012/0281360 A1* | 11/2012 | Nicol | G16H 20/13 |
| | | | 29/825 |
| 2018/0292119 A1 | 10/2018 | Sung | |
| 2020/0120765 A1 | 4/2020 | Xu et al. | |

FOREIGN PATENT DOCUMENTS

| | | | |
|---|---|---|---|
| CN | 207247701 U | | 4/2018 |
| CN | 209893722 U | | 1/2020 |
| EP | 3926262 A1 | | 12/2021 |
| FR | 2703443 A1 | | 10/1994 |
| FR | 2703443 B1 | | 2/1996 |
| JP | 2000-000080 A | | 1/2000 |
| JP | 2004-286346 A | | 10/2004 |
| JP | 2004286346 A | * | 10/2004 |
| KR | 20180106898 A | | 10/2018 |
| RU | 2110020 C1 | | 4/1998 |
| RU | 2568576 C2 | | 11/2015 |
| WO | WO 2018/223946 A1 | | 12/2018 |

OTHER PUBLICATIONS

Notice of Acceptance for Australia Patent Application No. 2020226427 dated Sep. 2, 2022 (3 pages).
Decision to Grant for Russia Patent Application No. 2021127340 dated Jul. 14, 2022 (7 pages).
Notification of Intent to Grant for EP Patent Application No. 20759760.0 dated Jan. 13, 2023 (25 pages).
$2^{nd}$ Office Action for EP Patent Application No. 20759760.0 dated Sep. 2, 2022 (4 pages).
1st Office Action for Australia Application No. 2020226427 dated May 13, 2022 (3 pages).
1st Office Action for European Application No. 20759760.0 dated Apr. 4, 2022 (5 pages).
1st Office Action for India Application No. 202137038131 dated Mar. 28, 2022 (5 pages).
1st Office Action for Russia Application No. 2021127340/10 (057678) dated Feb. 16, 2022 (10 pages).
Supplementary European Search Report for EP Application No. 20759760.0 dated Mar. 21, 2022 (4 pages).
Russian Search Report for Russia Application No. 2021127340/10(057678) dated Feb. 16, 2022 (4 pages).

* cited by examiner

REFRIGERATING AND FREEZING DEVICE

TECHNICAL FIELD

The present invention relates to the field of refrigerating and freezing, and in particular to a refrigerating and freezing device.

BACKGROUND ART

The quality of food is maintained during freezing. However, the frozen food needs to be heated before being processed or eaten. In order to facilitate users freezing and heating food, in the prior art, food is generally heated by disposing a heating device or a microwave device in a refrigerator and other refrigerating and freezing devices. However, a long heating time is generally required for heating food by the heating device, and the heating time and temperature are not easy to control, such that moisture evaporation and juice loss of food are easily caused, and the quality of food is lost. Heating food by microwave devices is fast and efficient, so the loss of nutritional ingredients in food is very low. However, due to the difference in the penetration of microwave to water and ice and the absorption of water and ice to microwave, and the uneven distribution of internal substances in food, the energy absorbed in the melted area is more, which easily causes uneven heating and local overheating.

In order to avoid the problems above, the applicant of this application previously proposed an electromagnetic heating method with good heating effect, but the previous electromagnetic heating device would occupy too much heating space, and the heat generated by the electromagnetic heating device itself is not easy to dissipate, thus affecting the heating effect.

SUMMARY OF THE INVENTION

One objective of the present invention is to overcome at least one of the defects of the prior art and provide a refrigerating and freezing device with a relatively large heating space and a high space utilization rate.

Another objective of the present invention is to rapidly and effectively cool a power supply module, so as to improve the power supply efficiency and prolong the service life thereof.

A further objective of the present invention is to avoid the power supply module from being affected by damp or dust deposit.

In order to achieve the objectives above, the present invention provides a refrigerating and freezing device, including:
- a cabinet, wherein at least one storage compartment is defined therein, and a heating cavity configured to contain a to-be-processed object is defined in one of the storage compartments; and
- an electromagnetic heating device, configured to supply electromagnetic waves into the heating cavity so as to heat the to-be-processed object in the heating cavity, wherein the electromagnetic heating device is provided with an electromagnetic generation module configured to produce an electromagnetic wave signal and a power supply module configured to supply a power source to the electromagnetic generation module, wherein
- a power supply box is provided above a top of the cabinet, and heat dissipation holes configured to achieve communication between the interior of the power supply box and an external environment where the power supply box is located are provided in a box body of the power supply box; and
- the power supply module is disposed in the power supply box, a heat dissipation fan is further provided in the power supply box and is configured to drive airflow to flow between the interior of the power supply box and the external environment where the power supply box is located through the heat dissipation holes, so as to dissipate heat from the power supply module.

Optionally, the power supply box includes a lower bottom shell disposed on a top surface of the cabinet and an upper box body covering a top of the lower bottom shell.

The power supply module and the heat dissipation fan are both disposed on the lower bottom shell.

Optionally, the upper box body includes a top wall and a peripheral wall extending downwards from a periphery of the top wall; and
- the heat dissipation holes include a plurality of air inlet holes provided in a first side wall of the peripheral wall and a plurality of air outlet holes provided in a second side wall of the peripheral wall opposite to the first side wall, so as to allow the airflow driven by the heat dissipation fan to enter the power supply box through the air inlet holes and flow out through the air outlet holes, and thus forced convection heat dissipation is carried out on the power supply module.

Optionally, the heat dissipation fan is located on a side of the power supply module adjacent to the air outlet holes, and an air inlet of the heat dissipation fan faces towards the power supply module.

Optionally, the heat dissipation fan is an axial flow fan.

Optionally, the upper box body further includes a water retaining rib extending downwards from the top wall thereof and adjacently located on an inner side of the peripheral wall thereof, so as to prevent external water from entering the power supply box.

Optionally, the water retaining rib surrounds the periphery of the power supply module, and rib plates of the water retaining rib opposite to the first side wall and the second side wall are provided with through holes respectively to allow airflow to flow therethrough.

Optionally, the power supply module includes a printed circuit board (PCB) configured to integrate a power source processing circuit. The PCB is provided with an input terminal configured to be connected with a power supply source and an output terminal configured to be connected with the electromagnetic generation module. Therefore, a power voltage input by the input terminal is processed by the power source processing circuit on the PCB and then output by the output terminal to the electromagnetic generation module.

Optionally, a storage device with a cylinder and a door is placed in one of the storage compartments, and the heating cavity is formed in the storage device.

The electromagnetic heating device further includes a radiation antenna and a signal processing and measurement control circuit which are disposed in the cylinder. The radiation antenna is electrically connected with the signal processing and measurement control circuit, and the electromagnetic generation module is electrically connected with the signal processing and measurement control circuit and then is electrically connected with the radiation antenna.

Optionally, the electromagnetic generation module is disposed on an outer side of a foaming layer of the cabinet, and the electromagnetic generation module is electrically connected with the signal processing and measurement control circuit through a wire predisposed in the foaming layer of the cabinet.

The refrigerating and freezing device of the present invention is provided with the electromagnetic heating device which utilizes electromagnetic waves to heat and thaw the to-be-processed object etc. The heating efficiency is high, the heating is uniform, and food quality can be guaranteed. Particularly, the power supply module configured to supply power to the electromagnetic generation module is disposed in the power supply box above the cabinet, that is, the power supply module is located outside the cabinet and does not occupy a storage space in the cabinet and a heating space in the heating cavity. Both the storage space and the heating space are relatively large, and the space utilization rate is high.

Meanwhile, due to the fact that the power supply module is located at the top outside the cabinet, heat generated by the power supply module will not be dissipated in the cabinet to influence the storage temperature in the storage compartments. More importantly, the heat dissipation holes are disposed in the box body of the power supply box, the heat dissipation fan is further disposed in the power supply box, and airflow can be driven by the heat dissipation fan to flow to promote heat generated by the power supply module to be dissipated to an external environment space. Therefore, the power supply module is cooled rapidly and effectively, the decrease of service life and efficiency caused by temperature rise during continuous working of the power supply module is completely eradicated, and meanwhile burn hazards caused by unintentional touch by users are completely eradicated.

Further, the power supply module is disposed in the relatively-closed power supply box, which may prevent the power supply module from being sprinkled by water or sticking dust and the like to a certain extent. The water retaining rib is particularly designed in the power supply box, and the water retaining rib is located on the inner side of the peripheral wall of the upper box body, so that water at the top of the cabinet can be prevented from immersing into the power supply box, causing the power supply module to be affected by damp or dust deposit and even causing unnecessary potential safety hazards.

The above, as well as other objectives, advantages, and features of the present invention, will be better understood by those skilled in the art according to the following detailed description of specific embodiments of the present invention taken in conjunction with the accompanying drawings.

BRIEF DESCRIPTION OF THE DRAWINGS

In the following part, some specific embodiments of the present invention will be described in detail in an exemplary rather than limited manner with reference to the accompanying drawings. The same reference numerals in the accompanying drawings indicate the same or similar components or parts. Those skilled in the art should understand that these accompanying drawings are not necessarily drawn to scale. In the accompanying drawings.

DETAILED DESCRIPTION OF THE INVENTION

Figure 1:
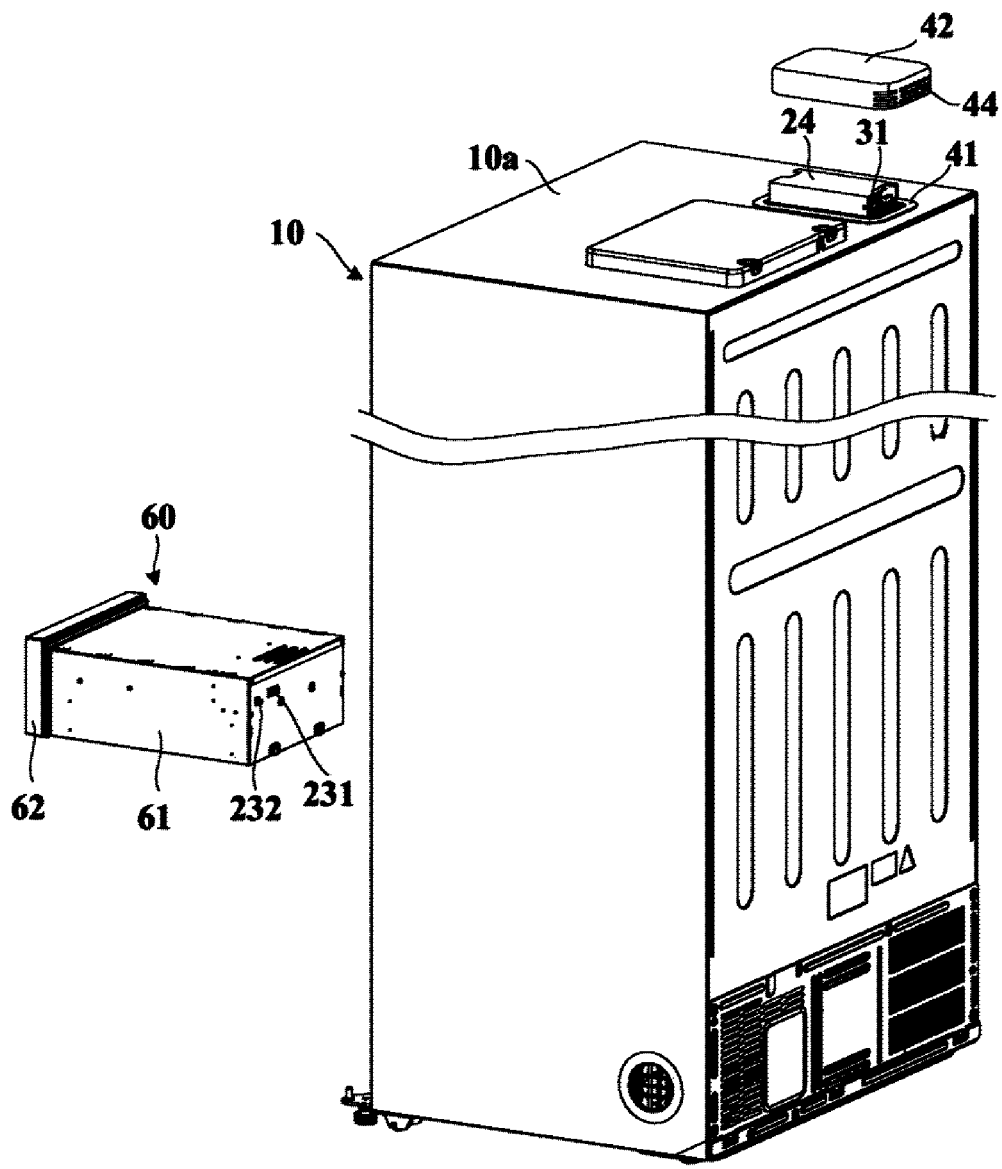
FIG. 1 is a schematic structural diagram of a refrigerating and freezing device according to an embodiment of the present invention.

The present invention provides a refrigerating and freezing device which may be a refrigerator, a freezer or other storage devices with refrigerating and/or freezing functions. FIG. 1 is a schematic structural diagram of a refrigerating and freezing device according to an embodiment of the present invention, and FIG. 2 is a schematic sectional view of a refrigerating and freezing device according to an embodiment of the present invention.

Figure 2:
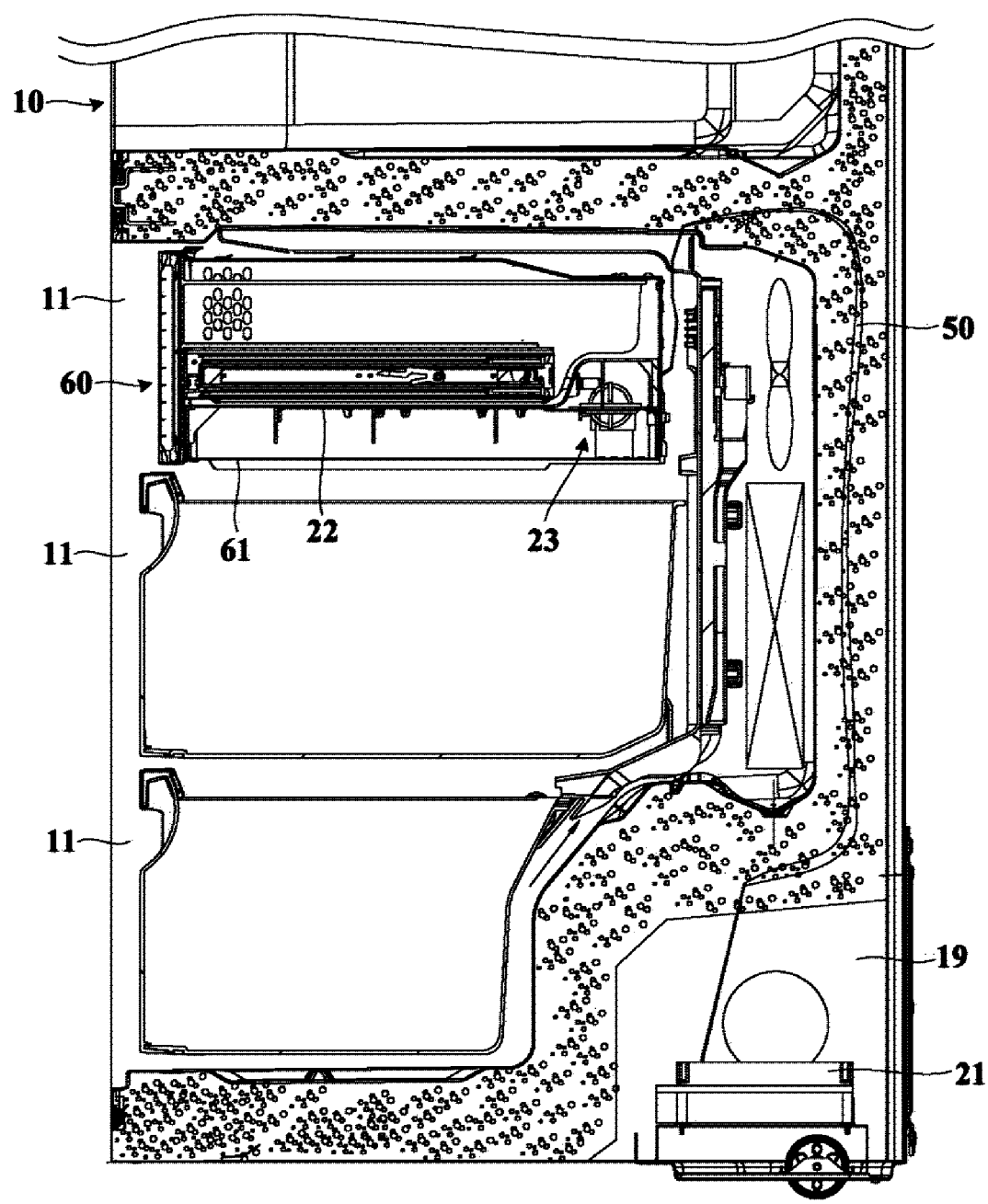
FIG. 2 is a schematic sectional view of a refrigerating and freezing device according to an embodiment of the present invention.

With reference to FIGS. 1-2, the refrigerating and freezing device 1 of the present invention includes a cabinet 10. At least one storage compartment 11 is defined in the cabinet 10. Further, the refrigerating and freezing device 1 may also includes a door for opening and/or closing the storage compartments 11. A heating cavity configured to contain a to-be-processed object is defined in one of the storage compartments 11. The heating cavity may heat and thaw the to-be-processed object, etc. Particularly, a plurality of storage compartments 11 may be defined in the cabinet 10, and may include, for example, a refrigerating compartment, a freezing compartment and a variable temperature compartment. The temperatures of the compartments above are different from one another, and therefore functions are different. The heating cavity may be formed in any one of the refrigerating compartment, the freezing compartment and the variable temperature compartment.

Further, the refrigerating and freezing device 1 further includes an electromagnetic heating device configured to supply electromagnetic waves into the heating cavity to heat the to-be-processed object in the heating cavity. The electromagnetic waves provided by the electromagnetic heating device may be electromagnetic waves with a suitable wavelength such as radio frequency waves, microwaves, and the like. The method of utilizing electromagnetic waves to heat the to-be-processed object has high heating efficiency and uniform heating, and can guarantee food quality. The electromagnetic heating device generally is provided with an electromagnetic generation module 21 configured to produce an electromagnetic wave signal and a power supply module 24 configured to supply a power source to the electromagnetic generation module 21. Because both the electromagnetic generation module 21 and the power supply module 24 have relatively large power, and generate more heat, therefore, the electromagnetic generation module 21 and the power supply module 24 may be disposed on an outer side of a foaming layer of the cabinet 10, so that the storage environment in the cabinet 10 is prevented from being influenced, and meanwhile heat dissipation is facilitated. The electromagnetic generation module 21 may be disposed, for example, outside a top of the cabinet 10, outside a back of the cabinet or inside a compressor bin 19, and the like.

Particularly, a power supply box 40 is provided above the top of the cabinet 10. Heat dissipation holes configured to achieve communication between the interior of the power supply box 40 and an external environment where the power supply box 40 is located are provided in a box body of the power supply box 40. The power supply module 24 is disposed in the power supply box 40, and a heat dissipation fan 31 is further provided in the power supply box 40 and is configured to drive airflow to flow between the interior of the power supply box 40 and the external environment where the power supply box 40 is located through the above heat dissipation holes, so as to dissipate heat from the power supply module 24.

The power supply module 24 configured to supply power to the electromagnetic generation module 21 is disposed in the power supply box 40 above the cabinet 10. That is, the power supply module 24 is located outside the cabinet 10 and does not occupy a storage space in the cabinet 10 and a heating space in the heating cavity. Both the storage space and the heating space are relatively large, and the space utilization rate is high.

Meanwhile, because the power supply module 24 is located at the top outside the cabinet 10, heat generated by the power supply module will not be dissipated in the cabinet 10 to influence the storage temperature in the storage compartments. More importantly, the heat dissipation holes are disposed in the box body of the power supply box 40, the heat dissipation fan 31 is further provided in the power supply box 40. The heat dissipation fan 31 may drive airflow to flow more rapidly to promote heat generated by the power supply module to be dissipated to an external environment space more rapidly. Accordingly, the power supply module 24 is cooled rapidly and effectively, the decrease of service life and efficiency caused by temperature rise during continuous working of the power supply module 24 is completely eradicated, and meanwhile burn hazards caused by unintentional touch by users are completely eradicated.

Figure 3:
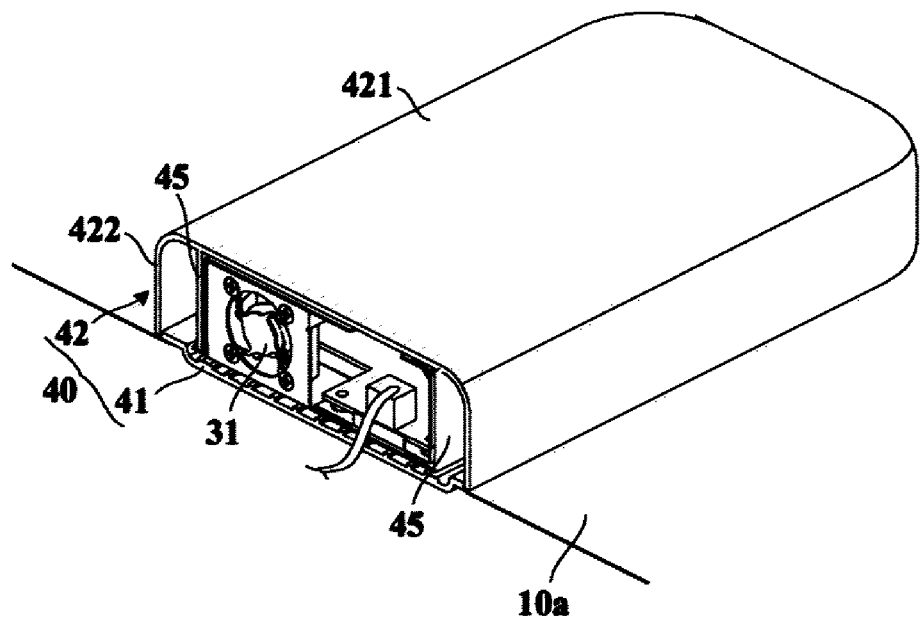
FIG. 3 and FIG. 4 are schematic sectional views of a structure at a power supply box in different directions according to an embodiment of the present invention.
Figure 4:
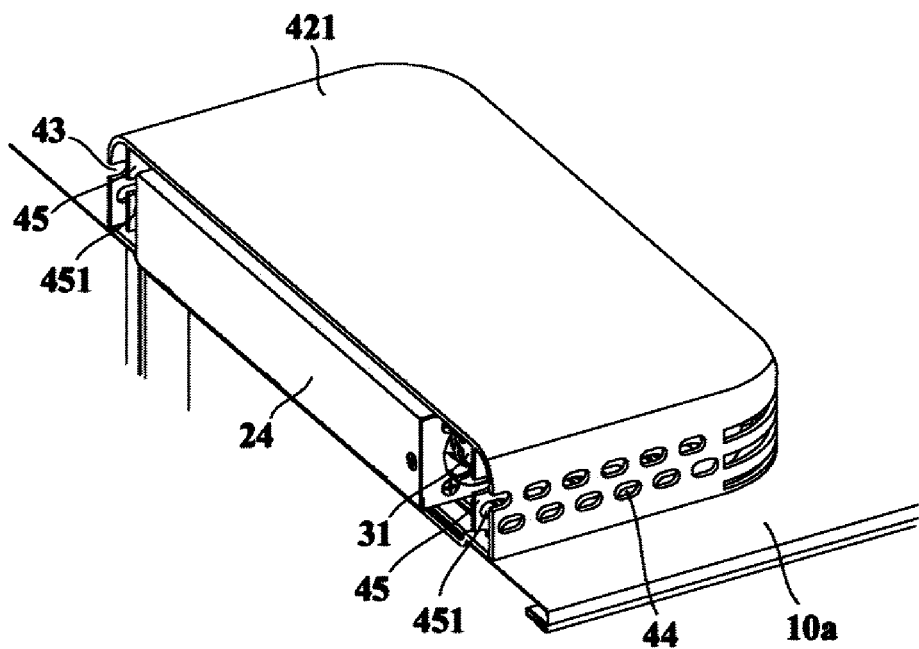

FIG. 3 and FIG. 4 are schematic sectional views of a structure at a power supply box in different directions according to an embodiment of the present invention. Sectional cutting lines in FIG. 3 and FIG. 4 are perpendicular to each other. With reference to FIG. 1 to FIG. 4, the power supply box 40 includes a lower bottom shell 41 disposed on a top surface of the cabinet 10 and an upper box body 42 covering a top of the lower bottom shell 41. Both the power supply module 24 and the heat dissipation fan 31 are disposed on the lower bottom shell 41. That is, the power supply module 24 and the heat dissipation fan 31 are both supported on the lower bottom shell 41. The upper box body 42 covers the power supply module 24, the heat dissipation fan 31 and the lower bottom shell 41 from top to bottom.

In some embodiments, the upper box body 42 includes a top wall 421 and a peripheral wall 422 extending downwards from a periphery of the top wall 421. The top wall 421 may protrude upwards from a top surface 10*a* of the cabinet 10, that is, the top wall 421 is higher than the top surface 10*a* of the cabinet 10, which does not only does not occupy space, but also can dissipate heat well. The heat dissipation holes above include a plurality of air inlet holes 43 provided in a first side wall of the peripheral wall 422 and a plurality of air outlet holes 44 provided in a second side wall of the peripheral wall 422 opposite to the first side wall, so as to allow the airflow driven by the heat dissipation fan 31 to enter the power supply box 40 through the air inlet holes 43 and flow out through the air outlet holes 44, and thus forced convection heat dissipation is carried out on the power supply module 24. That is, the air inlet holes 43 and the air outlet holes 44 may be disposed on two opposite side walls of the upper box body 42 to facilitate the airflow forming a convection effect, so that the flow rate of the airflow is increased, and the heat dissipation efficiency of the power supply module 24 is further improved.

In some embodiments, the heat dissipation fan 31 may be located on a side of the power supply module 24 adjacent to the air outlet holes 44. An air inlet of the heat dissipation fan 31 faces towards the power supply module 24 so as to promote airflow to flow into the power supply box 40 from the air inlet holes 43 more rapidly and to flow out of the air outlet holes 44 more rapidly, thus improving the flow rate of the airflow.

Further, the heat dissipation fan 31 may be an axial flow fan. In some other embodiments, the heat dissipation fan 31 may alternatively be other types of fans, such as a centrifugal fan, a cross-flow fan, and the like as long as an air path of the heat dissipation fan in the power supply box 40 is arranged well and an air outlet thereof is made to face towards the power supply module 24.

Further, one, two, three or more heat dissipation fans 31 are provided.

In some embodiments, the upper box body 42 further includes a water retaining rib 45 extending downwards from the top wall thereof and adjacently located on an inner side of the peripheral wall thereof, so as to prevent external water from entering the power supply box 40. Due to the arrangement of the power supply box 40 itself, the power supply module 24 may be prevented from being sprinkled by water or sticking dust and the like to a certain extent. The water retaining rib 45 is particularly designed in the power supply box 40, and the water retaining rib 45 is located on an inner side of the peripheral wall of the upper box body 42, so that water at the top of the cabinet 10 may be prevented from immersing into a containing space 14, causing the power supply module 24 to be affected by damp or dust deposit and even causing unnecessary potential safety hazards Specifically, the water retaining rib 45 may extend downwards to abut against the bottom wall of the lower bottom shell 41 so as to play a better waterproof role.

In some embodiments, the water retaining rib 45 surrounds the periphery of the power supply module 24. That is, the water retaining rib 45 has four rib plates connected in sequence, so as to prevent water from entering the power supply module 24 from any one side. Through holes 451 are provided in the rib plates of the water retaining rib 45 opposite to the first side wall and the second side wall of the peripheral wall 422 respectively to allow airflow to flow therethrough, so that it is guaranteed that arrangement of the water retaining rib 45 does not affect normal flow of the airflow.

Figure 5:
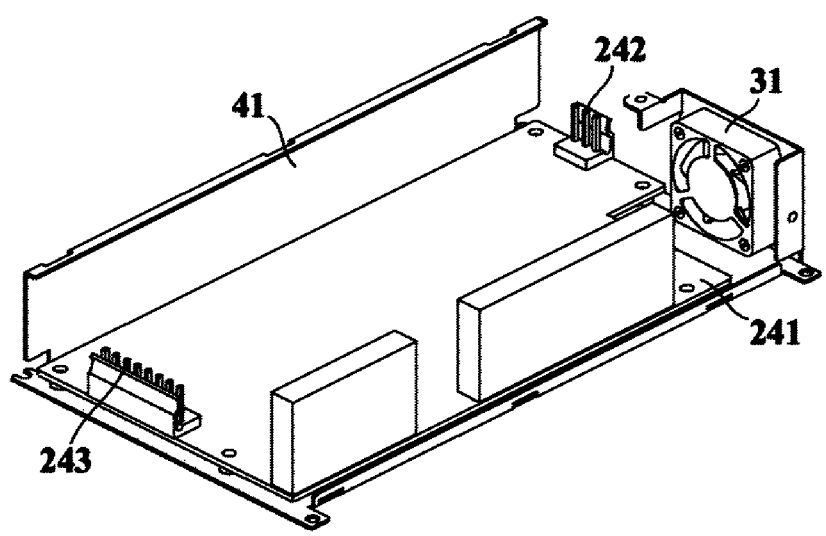
FIG. 5 is a schematic structural diagram of a lower bottom shell of a power supply box according to an embodiment of the present invention.

FIG. 5 is a schematic structural diagram of a lower bottom shell of a power supply box according to an embodiment of the present invention. With reference to FIG. 5, the power supply module 24 may include a printed circuit board (PCB) 241 configured to integrate a power source processing circuit. The PCB 241 is provided with an input terminal 242 configured to be connected with a power supply source and an output terminal 243 configured to be connected with the electromagnetic generation module 21. Therefore, a power voltage input by the input terminal 242 is processed by the power source processing circuit on the PCB 241 and then output by the output terminal 243 to the electromagnetic generation module 21. Specifically, the input terminal 242 and the output terminal 243 may be located at two opposite ends of the PCB 241 respectively.

In some embodiments, a storage device 60 with a cylinder 61 and a door 62 is placed in one of the storage compartments 11. A heating cavity is formed in the storage device 60. During heating treatment, the door 62 closes the cylinder 61, so that a closed heating cavity is formed, and electromagnetic leakage is avoided.

Further, the electromagnetic heating device further includes a radiation antenna 22 and a signal processing and measurement control circuit 23 which are disposed in the cylinder 61. The radiation antenna 22 is electrically connected with the signal processing and measurement control circuit 23. The electromagnetic generation module 21 is electrically connected with the signal processing and measurement control circuit 23 and then is electrically connected with the radiation antenna 22.

Still further, the electromagnetic generation module 21 may be disposed on the outer side of the foaming layer of the cabinet 10. The electromagnetic generation module 21 may be electrically connected with the signal processing and measurement control circuit 23 through a wire 50 predisposed in the foaming layer of the cabinet 10. Specifically, the electromagnetic generation module 21 may be disposed in the compressor bin 19. The electromagnetic generation module 21 and the power supply module 24 are connected through a power line predisposed in the foaming layer of the cabinet 10.

Specifically, the signal processing and measurement control circuit 23 is provided with a first radio frequency port 231 and a first signal transmission interface 232 which are led out from a rear wall of the storage device 60. The electromagnetic generation module 21 is provided with a second radio frequency port and a second signal transmission interface. The first radio frequency port 231 is connected with the second radio frequency port through a radio frequency cable predisposed in the foaming layer of the cabinet 10, and the first signal transmission interface 232 is connected with the second signal transmission interface through a signal transmission cable predisposed in the foaming layer of the cabinet 10.

The cylinder 61 may be provided with a take-and-place opening for facilitating the taking and placing of objects. The door 62 may include an end plate with conductivity. When the door 62 is closed, the end plate closes the take-and-place opening of the cylinder 61, thereby closing the heating cavity in the cylinder 61. The end plate may be a metal end plate made of a conductive metal material or may be a conductive end plate made of other conductive materials. The door 62 further includes at least one conductive connector electrically connected with the end plate. The conductive connector is configured to be electrically connected with the cylinder 61 at least when the door 62 is in a closed state of closing the take-and-place opening of the cylinder 61, so that the cylinder 61 and the door 62 form a continuously conductive shield when the door 62 is in the closed state. Therefore, it can be guaranteed that stable electrical connection is formed between the cylinder 61 and the door 62, so that the continuously conductive shield is formed during heating, electromagnetic waves are prevented from being emitted through a gap, electromagnetic radiation is effectively shielded, and damage of electromagnetic radiation to a human body is eliminated. The cylinder 61 may be a metallic cylinder or a non-metallic cylinder provided thereon with electromagnetic shielding features, such as a conductive coating, a conductive metal mesh, and the like.

Those skilled in the art should understand that unless otherwise stated, the terms such as "top," "bottom," "inside," "outside," "transverse," "front," "back" and the like used for representing orientation or position relationships in the embodiments of the present invention are based on the practical use state of the refrigerating and freezing device 1. The terms are used merely to facilitate the description and understanding of the technical solution of the present invention rather than indicating or implying that the mentioned device or components must have a particular orientation. Therefore, such terms should not be construed as limitation of the present invention.

Hereto, those skilled in the art should realize that although multiple exemplary embodiments of the present invention have been shown and described in detail herein, without departing from the spirit and scope of the present invention, many other variations or modifications that conform to the principles of the present invention can still be directly determined or deduced from contents disclosed in the present invention. Therefore, the scope of the present invention should be understood and deemed to cover all such other variations or modifications.

The invention claimed is:

1. A refrigerating and freezing device, comprising:
a cabinet, wherein at least one storage compartment is defined therein, and a heating cavity configured to contain a to-be-processed object is defined in one of the at least one storage compartment; and
an electromagnetic heating device, configured to supply electromagnetic waves into the heating cavity so as to heat the to-be-processed object in the heating cavity, wherein the electromagnetic heating device comprises an electromagnetic generation module configured to produce an electromagnetic wave signal and a power supply module configured to supply a power source to the electromagnetic generation module, wherein
a power supply box is provided above a top of the cabinet, and heat dissipation holes configured to achieve communication between the interior of the power supply box and an external environment where the power supply box is located are provided in a box body of the power supply box; and
the power supply module is disposed in the power supply box, a heat dissipation fan is further provided in the power supply box and is configured to drive airflow to flow between the interior of the power supply box and the external environment where the power supply box is located through the heat dissipation holes, so as to dissipate heat from the power supply module, wherein
a storage device with a cylinder and a door is placed in one of the at least one storage compartment, and the heating cavity is formed in the storage device; and
the electromagnetic heating device further comprises a radiation antenna and a signal processing and measurement control circuit which are disposed in the cylinder, the radiation antenna is electrically connected with the signal processing and measurement control circuit, and the electromagnetic generation module is electrically connected with the signal processing and measurement control circuit and then is electrically connected with the radiation antenna.

2. The refrigerating and freezing device according to claim 1, wherein
the power supply box comprises a lower bottom shell disposed on a top surface of the cabinet and an upper box body covering a top of the lower bottom shell; and
the power supply module and the heat dissipation fan are both disposed on the lower bottom shell.

3. The refrigerating and freezing device according to claim 2, wherein
the upper box body comprises a top wall and a peripheral wall extending downwards from a periphery of the top wall; and
the heat dissipation holes comprise a plurality of air inlet holes provided in a first side wall of the peripheral wall and a plurality of air outlet holes provided in a second side wall of the peripheral wall opposite to the first side wall, so as to allow the airflow driven by the heat dissipation fan to enter the power supply box through the plurality of air inlet holes and flow out through the plurality of air outlet holes, and thus forced convection heat dissipation is carried out on the power supply module.

4. The refrigerating and freezing device according to claim 3, wherein
the heat dissipation fan is located on a side of the power supply module adjacent to the plurality of air outlet holes, and an air inlet of the heat dissipation fan faces towards the power supply module.

5. The refrigerating and freezing device according to claim 4, wherein
the heat dissipation fan is an axial flow fan.

6. The refrigerating and freezing device according to claim 3, wherein
the upper box body further comprises a water retaining rib extending downwards from the top wall thereof and adjacently located on an inner side of the peripheral wall thereof, so as to prevent external water from entering the power supply box.

7. The refrigerating and freezing device according to claim 6, wherein
the water retaining rib surrounds the periphery of the power supply module, and rib plates of the water retaining rib opposite to the first side wall and the second side wall are provided with through holes respectively to allow airflow to flow therethrough.

8. The refrigerating and freezing device according to claim 1, wherein
the power supply module comprises a printed circuit board (PCB) configured to integrate a power source processing circuit, the PCB is provided with an input terminal configured to be connected with a power supply source and an output terminal configured to be connected with the electromagnetic generation module, and therefore a power voltage input by the input terminal is processed by the power source processing circuit on the PCB and then output by the output terminal to the electromagnetic generation module.

9. The refrigerating and freezing device according to claim 1, wherein
the electromagnetic generation module is disposed on an outer side of a foaming layer of the cabinet, and the electromagnetic generation module is electrically connected with the signal processing and measurement control circuit through a wire predisposed in the foaming layer of the cabinet.

* * * * *